US011921237B2

United States Patent
Droz et al.

(10) Patent No.: US 11,921,237 B2
(45) Date of Patent: \*Mar. 5, 2024

(54) SYSTEMS AND METHODS FOR BIASING LIGHT DETECTORS

(71) Applicant: Waymo LLC, Mountain View, CA (US)

(72) Inventors: Pierre-yves Droz, Los Altos, CA (US); Vadim Gutnik, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,508

(22) Filed: May 31, 2022

(65) Prior Publication Data

US 2022/0291356 A1 Sep. 15, 2022

Related U.S. Application Data

(63) Continuation of application No. 16/696,975, filed on Nov. 26, 2019, now Pat. No. 11,378,663.

(51) Int. Cl.
*G01S 7/4861* (2020.01)
*G01J 1/44* (2006.01)
(Continued)

(52) U.S. Cl.
CPC ............... *G01S 7/4861* (2013.01); *G01J 1/44* (2013.01); *G01J 1/46* (2013.01);
(Continued)

(58) Field of Classification Search
CPC ...... G01S 7/4861; G01S 17/10; G01S 17/894; G01S 7/4863; G01J 1/44; G01J 2001/4446; G01J 1/46; G01J 2001/4453
See application file for complete search history.

(56) References Cited

U.S. PATENT DOCUMENTS 4,001,614 A    1/1977  Dahlinger
5,696,657 A   12/1997  Nourrcier, Jr. et al.
(Continued)

FOREIGN PATENT DOCUMENTS

WO    2019088974 A1    5/2019

OTHER PUBLICATIONS

International Search Report and Written Opinion, dated Mar. 9, 2021, in International Patent Application No. PCT/US2020/061035.
(Continued)

*Primary Examiner* — Jennifer D Bennett
*Assistant Examiner* — Erin R Garber
(74) *Attorney, Agent, or Firm* — McDonnell Boehnen Hulbert & Berghoff LLP

(57) ABSTRACT

An example circuit includes a light detector and a biasing capacitor having (i) a first terminal that applies to the light detector an output voltage that can either bias or debias the light detector and (ii) a second terminal for controlling the output voltage. The circuit includes a first transistor connected to the second terminal of the biasing capacitor and configured to drive the output voltage to a first voltage level above a biasing threshold of the light detector and thereby biasing the light detector. The circuit includes a second transistor connected to the second terminal of the biasing capacitor and configured to drive the output voltage to a second voltage level below the biasing threshold of the light detector and thereby debiasing the light detector. The second voltage is a non-zero voltage that corresponds to a charge level of the biasing capacitor.

20 Claims, 7 Drawing Sheets

(51) Int. Cl.
  *G01J 1/46* (2006.01)
  *G01S 17/10* (2020.01)
  *G01S 17/894* (2020.01)
(52) U.S. Cl.
  CPC ............... *G01J 2001/4446* (2013.01); *G01J 2001/4453* (2013.01); *G01S 17/10* (2013.01); *G01S 17/894* (2020.01)

(56) References Cited

U.S. PATENT DOCUMENTS

| | | | |
|---|---|---|---|
| 7,446,601 B2 | 11/2008 | LeChevalier | |
| 7,911,278 B1 | 3/2011 | Degtiarenko et al. | |
| 8,581,168 B2 | 11/2013 | Linder et al. | |
| 9,029,772 B2 | 5/2015 | Pavlov | |
| 9,164,144 B2 | 10/2015 | Dolinsky | |
| 9,176,241 B2 | 11/2015 | Frach | |
| 9,634,156 B2 | 4/2017 | Pavlov et al. | |
| 9,810,795 B2 | 11/2017 | Jackson et al. | |
| 9,874,644 B2 | 1/2018 | Frach et al. | |
| 9,985,071 B2 | 5/2018 | Irish et al. | |
| 10,018,505 B2 | 7/2018 | Clemens et al. | |
| 10,158,038 B1* | 12/2018 | Do Valle | H04N 25/70 |
| 10,205,033 B1 | 2/2019 | Daly et al. | |
| 10,276,610 B2 | 4/2019 | McGarvey et al. | |
| 11,378,663 B2* | 7/2022 | Droz | G01J 1/46 |
| 2003/0210917 A1 | 11/2003 | Stewart et al. | |
| 2013/0051655 A1 | 2/2013 | Collard et al. | |
| 2013/0250273 A1 | 9/2013 | Ludwig | |
| 2014/0191115 A1 | 7/2014 | Webster et al. | |
| 2014/0211192 A1 | 7/2014 | Grootjans et al. | |
| 2015/0192676 A1 | 7/2015 | Kotelnikov et al. | |
| 2017/0370769 A1* | 12/2017 | Asano | H04N 25/622 |
| 2018/0180470 A1 | 6/2018 | Seitz | |
| 2018/0180471 A1 | 6/2018 | Marra et al. | |
| 2018/0180473 A1 | 6/2018 | Clemens et al. | |
| 2018/0259625 A1 | 9/2018 | Gnecchi et al. | |
| 2018/0261975 A1 | 9/2018 | Pavlov et al. | |
| 2018/0306908 A1 | 10/2018 | Meng et al. | |
| 2019/0146027 A1 | 5/2019 | McLaughlin, II | |
| 2019/0250257 A1* | 8/2019 | Finkelstein | G01S 7/4863 |
| 2019/0310375 A1 | 10/2019 | Finkelstein et al. | |
| 2020/0007798 A1* | 1/2020 | Liu | H04N 25/75 |
| 2020/0109987 A1* | 4/2020 | Willassen | G01S 7/4865 |
| 2020/0127565 A1 | 4/2020 | Liang et al. | |
| 2020/0300621 A1* | 9/2020 | Kubota | G01S 7/4863 |
| 2020/0410203 A1 | 12/2020 | Chang et al. | |
| 2021/0209326 A1 | 7/2021 | Cao et al. | |

OTHER PUBLICATIONS

Buzhan et al., "An Advanced Study Of Silicon Photomultiplier", ICFA Instrumentation Bulletin, vol. 23 (2001), 14 pages.

Zhang et al., "A real-time noise filtering strategy for photon counting 3D imaging lidar," Optics Express, vol. 21, No. 8 (2013), 8 pages.

Gatt et al., "Laser Radar Detection Statistics: A Comparison of Coherent and Direct Detection Receivers," Laser Radar Technology and Applications VI, Gary W. Kamerman, Editor, Proceedings of SPIE, vol. 4377 (2001), 12 pages.

* cited by examiner

400

```
┌─────────────────────────────────────────────────────────────┐
│  CHARGING, TO A CHARGE LEVEL, A BIASING CAPACITOR HAVING A FIRST
│  TERMINAL AND A SECOND TERMINAL, WHEREIN THE FIRST TERMINAL OF THE
│  BIASING CAPACITOR IS CONFIGURED TO APPLY AN OUTPUT VOLTAGE TO A
│  LIGHT DETECTOR, AND WHEREIN THE CHARGING IS VIA THE FIRST TERMINAL  402
└─────────────────────────────────────────────────────────────┘
                              ↓
┌─────────────────────────────────────────────────────────────┐
│  CONNECTING THE SECOND TERMINAL OF THE BIASING CAPACITOR TO A
│    VOLTAGE SOURCE DURING A FIRST PORTION OF A PULSE PERIOD
│  ASSOCIATED WITH THE LIGHT DETECTOR, WHEREIN CONNECTING THE
│  SECOND TERMINAL TO THE VOLTAGE SOURCE DRIVES THE OUTPUT VOLTAGE
│   TO A FIRST VOLTAGE LEVEL ABOVE A BIASING THRESHOLD OF THE LIGHT   404
│        DETECTOR AND THEREBY BIASING THE LIGHT DETECTOR
└─────────────────────────────────────────────────────────────┘
                              ↓
┌─────────────────────────────────────────────────────────────┐
│    CONNECTING THE SECOND TERMINAL OF THE BIASING CAPACITOR TO
│    GROUND DURING A SECOND PORTION OF THE PULSE PERIOD, WHEREIN
│    CONNECTING THE SECOND TERMINAL TO GROUND DRIVES THE OUTPUT
│  VOLTAGE TO A SECOND VOLTAGE LEVEL BELOW THE BIASING THRESHOLD
│  OF THE LIGHT DETECTOR AND THEREBY DEBIASING THE LIGHT DETECTOR,
│       WHEREIN THE SECOND VOLTAGE IS A NON-ZERO VOLTAGE THAT         406
│    CORRESPONDS TO THE CHARGE LEVEL OF THE BIASING CAPACITOR
└─────────────────────────────────────────────────────────────┘
```

FIGURE 4

SYSTEMS AND METHODS FOR BIASING LIGHT DETECTORS

CROSS-REFERENCE TO RELATED APPLICATIONS

This application is a continuation of U.S. patent application Ser. No. 16/696,975, filed Nov. 26, 2019, which is incorporated herein by reference.

BACKGROUND

Unless otherwise indicated herein, the materials described in this section are not prior art to the claims in this application and are not admitted to be prior art by inclusion in this section.

A Light Detection and Ranging (LIDAR) device is used for sensing aspects of an environment. A plurality of light emitters emit light into an environment surrounding the device, and a plurality of light detectors detect reflected light. Based on time differences between light emissions and receiving the reflected light, the LIDAR device can generate data that can be used to generate three-dimensional (3D) point cloud data that can be interpreted to render a representation of the environment.

The light emitters and light detectors consume power to emit light and detect light respectively. During some periods while operating the LIDAR device, light emitters and light detectors are not emitting light or being used to listen for reflected portions of light respectively, but still consume power.

SUMMARY

In a first example, a circuit is provided. The circuit includes a light detector. The circuit includes a biasing capacitor having (i) a first terminal that applies an output voltage to the light detector and (ii) a second terminal for controlling the output voltage. The circuit includes a voltage difference driver configured to connect the second terminal to a voltage source during a first portion of a pulse period of the light detector. Connecting the second terminal to the voltage source drives the output voltage to a first voltage level above a biasing threshold of the light detector and thereby biases the light detector. The voltage difference driver is configured to disconnect the second terminal from the voltage source to ground during a second portion of the pulse period. Disconnecting the second terminal from the voltage source causes the output voltage to reach a second voltage below the biasing threshold of the light detector and thereby debiases the light detector.

In a second example, a method is provided. The method includes charging, to a charge level, a biasing capacitor having a first terminal and a second terminal. The first terminal of the biasing capacitor is configured to apply an output voltage to a light detector, and the charging is via the first terminal. The method includes connecting the second terminal of the biasing capacitor to a voltage source during a first portion of a pulse period associated with the light detector. Connecting the second terminal to the voltage source drives the output voltage to a first voltage level above a biasing threshold of the light detector and thereby biasing the light detector. The method includes connecting the second terminal of the biasing capacitor to ground during a second portion of the pulse period. Connecting the second terminal to ground drives the output voltage to a second voltage level below the biasing threshold of the light detector and thereby debiasing the light detector. The second voltage is a non-zero voltage that corresponds to the charge level of the biasing capacitor.

In a third example, a method is provided. The method includes, during a first period preceding a light pulse, using a voltage difference driver to drive an output voltage to a first level. Driving the output voltage to the first level biases a light detector. The method includes, determining a background light level of an environment during the first period based on biasing the light detector. The method includes, during a second period, using the voltage difference driver to reduce the output voltage to a second level. Reducing the output voltage to the second level causes the light detector to be debiased. The method includes, during the second period, concurrently with the light detector being debiased, emitting the light pulse. The method includes, during a third period following the light pulse, using the voltage difference driver to drive the output voltage to the first level. Driving the output voltage to the first level biases the light detector. The method includes determining a reflected portion of the light pulse during the third period based on biasing the light detector.

BRIEF DESCRIPTION OF THE FIGURES

FIG. 4 is a block diagram of a method, according to an example embodiment.

DETAILED DESCRIPTION

Figure 1:
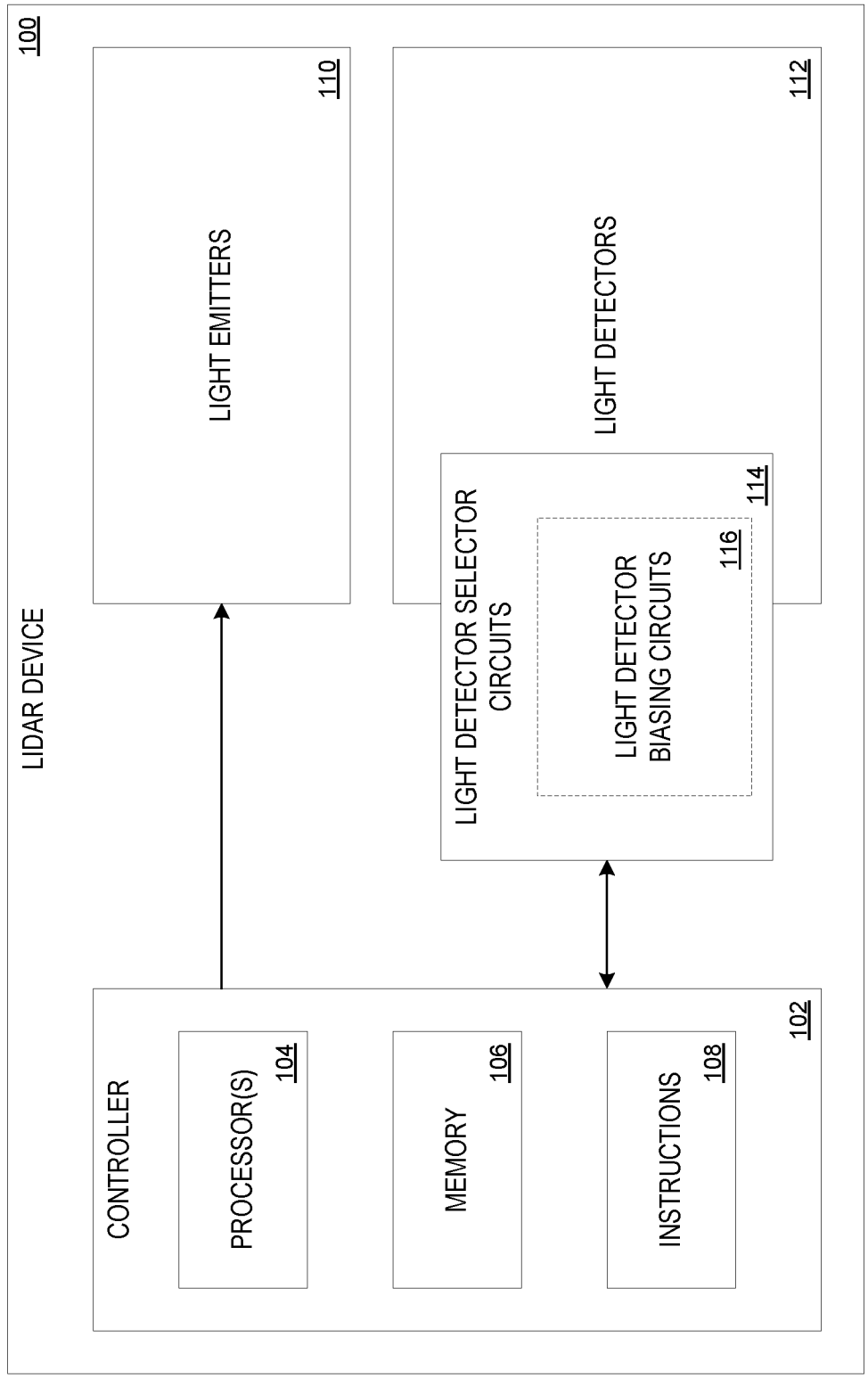
FIG. 1 is a block diagram of a LIDAR device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

A light detector, such as a silicon photomultiplier (SiPM), can generate current in response to receiving light. For example, a SiPM generates a current in response to receiving a single photon when the SiPM is reversed-biased with a voltage that is well above the breakdown voltage. For example, this biasing voltage could be about 50 V. However, in a device (e.g., a LIDAR device) that includes many SiPMs, biasing the SiPMs continuously may consume a substantial amount of power. To use power more efficiently, the SiPMs can be biased only at certain selected times. For example, in a LIDAR device, a SiPM may be biased during two separate periods of time relative to when the SiPM's corresponding light emitter (e.g., a laser diode) is fired: a first period of time (e.g., 1 microsecond) before the laser diode is fired, in order to obtain a background measurement; and a second period of time (e.g., 2 microseconds) after the laser diode is fired that serves as a listening period within which the SiPM can detect a return pulse. During other periods of time, the SiPM is debiased. In this manner, power can be conserved during the debiasing period.

Selective debiasing of light detectors can be based on known aspects of the environment, and can allow for increased dynamic range of a LIDAR device. For example, during a first scan using the light emitters and light detectors, a portion of the environment may be identified that has a relatively strong reflection (e.g., a retroreflector may return a relatively high reflection of an emitted light pulse, such as 95% or more of an emitted light pulse). In other examples, highly-reflective aspects of the environment may be predetermined (e.g., mapped). The LIDAR device may debias the SiPM in anticipation of receiving the relatively strong reflection, to cause the SiPM to operate more like an avalanche photodiode (APD) and produce a lower gain than when the SiPM is biased. Debiasing the SiPM in this manner can prevent oversaturating an Analog-to-Digital converter (ADC) used for sampling outputs of the biasing circuit.

To achieve selective biasing and debiasing of a SiPM, a circuit can be configured to apply a voltage (Vout) to the SiPM that can be adjusted between two levels: a high level (e.g., 50 V) that is sufficient to bias the SiPM and a low level (e.g., 40 V) that is too low to bias the SiPM. In one approach, the circuit includes a capacitor that is charged up (e.g., using a boost converter or buck converter) so that the voltage across the capacitor is at the low level. A first terminal of the capacitor applies Vout. A second terminal of the capacitor can be selectively connected to either ground or to a voltage source that can apply a voltage (Vdiff) that corresponds to the difference between the low level and the high level. For example, the circuit can include a first FET that can connect the second terminal of the capacitor to ground and a second FET that can connect the second terminal of the capacitor to the voltage source. In this way, control voltages applied to the gates of the FET can be used to control whether Vout is at the high level, thereby biasing the SiPM, or at the low level, thereby debiasing the SiPM. Specifically, when the first FET is on and the second FET is off, the second terminal of the capacitor is connected to ground and Vout is at the low level. When the first FET is off and the first FET is on, the second terminal of the capacitor is connected to the voltage source and Vout is at the high level.

Within examples, biasing and debiasing a SiPM can be performed in accordance with a regular cycle. For example, a known pulse period may be associated with a laser diode emitting light, and biasing and debiasing the SiPM may be performed in accordance with the known pulse period. In this manner, the corresponding circuit may operate in cooperation with other circuitry configured for emitting light from one or more laser diodes.

In some examples, each light detector includes a SiPM that is configured to provide a signal indicative of the number of photons received in a reflection of a light pulse from a particular laser diode. The detection occurs during a listening period that has a defined duration (e.g., 2 microseconds) after the laser diode is fired. A light pulse is detected when a sampled photon count exceeds a threshold. The threshold count may correspond to a particular output of the SiPM, such as a voltage resulting from the SiPM receiving a given number of photons while the SiPM is operationally biased. The threshold can be determined dynamically for each listening period. For example, each light detector can measure a background noise level during a background measurement period of defined duration (e.g., 1 microsecond) before the laser diode is fired. The threshold used in the listening period of each particular light detector can be based on the background noise level that is measured during the background measurement period of that particular light detector. For example, the threshold may correspond to a voltage level detected during the background measurement period.

II. Example Systems

FIG. 1 is a block diagram of a LIDAR device, according to an example embodiment. In particular, FIG. 1 shows a LIDAR device 100 having a controller 102, a plurality of light emitters 110 and a corresponding plurality of light detectors 112.

Controller 102 includes processor(s) 104, a memory 106, and instructions 108 stored on the memory 106 and executable by the processor(s) 104 to perform functions.

The processor(s) 104 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 106 may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Other types of storage devices, memories, and media are contemplated herein.

FIG. 1 also shows a plurality of light detector selector circuits 114 and a corresponding plurality of light detector biasing circuits 116. The instructions 108 are stored on memory 106 and executable by the processor(s) 104 to perform functions related to controlling the light detector selector circuits 114 and corresponding to light detector biasing circuits 116. The instructions 108 are further executable to perform functions related to selecting and powering the plurality of light emitters 110. The light detectors 112 can receive reflections from light pulses of the light emitters 110 and the controller 102 can use values (e.g., voltage and/or current) sampled from the light detectors to generate 3D point cloud data, and can process the 3D point cloud data (or perhaps facilitate processing the 3D point cloud data by another computing device, such as the system controller of a system associated with the LIDAR device 100, such as a vehicle controller of a vehicle). Though FIG. 1 depicts a plurality of light emitters and corresponding light detectors it should be understood that a LIDAR device may include a single light emitter. For example, a single light emitter can be used in conjunction with one or more movable mirrors to produce a plurality of beams of light. The functionality described herein may be carried out in single-emitter configurations and in multiple-emitter configurations.

The controller 102 can determine 3D point cloud data by using the light emitters 110 to emit pulses of light. A time of emission is established for each light emitter and a relative location at the time of emission is also tracked. Aspects of an environment of the LIDAR device 100, such as various objects, reflect the pulses of light. For example, when the LIDAR device 100 is in an environment that includes a road, such objects may include vehicles, signs, pedestrians, road surfaces, construction cones, or the like. Some objects may be more reflective than others, such that an intensity of reflected light may indicate a type of object that reflects the light pulses. Further, surfaces of objects may be at different positions relative to the LIDAR device 100, and thus take more or less time to reflect portions of light pulses back to the LIDAR device 100. Accordingly, the controller 102 may track a detection time at which a reflected light pulse is detected by a light detector and a relative position of the light detector at the detection time. By measuring time differences between emission times and detection times, the controller 102 can determine how far the light pulses travel prior to being received, and thus a relative distance of a corresponding object. By tracking relative positions at the emission times and detection times the controller 102 can determine an orientation of the light pulse and reflected light pulse relative to the LIDAR device 100, and thus a relative orientation of the object. By tracking intensities of received light pulses, the controller 102 can determine how reflective the object is. The 3D point cloud data determined based on this information may thus indicate relative positions of detected reflected light pulses (e.g., within a coordinate system, such as a Cartesian coordinate system) and intensities of each reflected light pulse.

Within examples, the controller 102 and/or circuitry associated with the LIDAR device 100 may determine light intensities based on a comparison of light received at a first time and light received at a second time. For example, the controller 102 may determine a background light level (which may, for example, relate to a number of photons received by the light detector during a given timeframe) received by a light detector directly prior to causing a corresponding light emitter to emit light, and determine a reflection light level received by the light detector after causing the light emitter to emit light. Detecting reflected light in this manner may involve biasing a semiconductor element, such as a light detector. For example, the light detector can be a SiPM sensitive enough that its output can be used to identify when individual photons are received.

Further aspects of SiPMs and corresponding functionality of the LIDAR device 100 are described below.

Figure 2A:
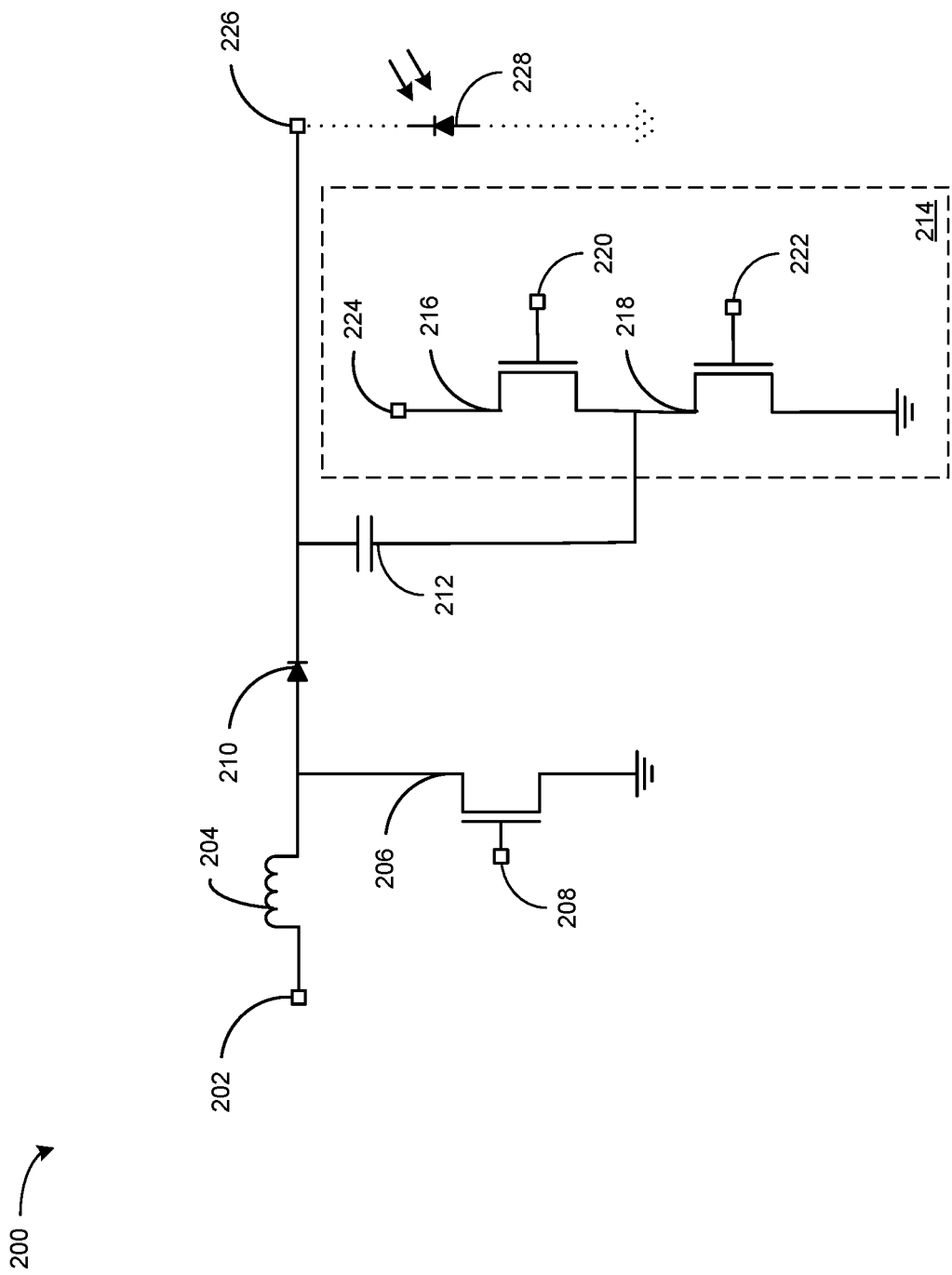
FIG. 2A illustrates a light detector biasing circuit, according to an example embodiment.

FIG. 2A illustrates a light detector biasing circuit, according to an example embodiment. In particular, FIG. 2A shows a circuit 200 that may have the same or similar functionality to a light detector biasing circuit from the plurality of light detector biasing circuits 116 shown in FIG. 1. Circuit 200 includes a voltage input node 202 that may be used to provide voltage to a biasing capacitor 212 of the circuit 200. The voltage input node 202 may be connected to a larger circuit, such as a detector selector circuit or be connected directly to a voltage source. Circuit 200 further includes an inductor 204 connected to the voltage input node 202 at a first terminal and connected to an anode of a diode 210 at a second terminal. The second terminal of inductor 204 and the anode of diode 210 are connected to a transistor 206 having a gate 208. A cathode of diode 210 is connected to a first terminal of capacitor 212 at an output node. The voltage input node 202, inductor 204, transistor 206, and diode 210 form a boost converter whereby controlling the transistor 206 using gate 208 at a duty cycle can charge capacitor 212 in accordance with a voltage at the voltage input node 202 and the duty cycle. Though a boost converter is depicted in FIG. 2A, other ways of charging the capacitor 212 (e.g., using a buck converter or buck-boost converter) are possible. Using voltage converters to charge capacitor 212 may allow for the capacitor 212 to be charged to a level that corresponds to a light detector using a common voltage source of the LIDAR device that uses a different voltage level.

The second terminal of capacitor 212 is connected to a voltage difference driver 214. The voltage difference driver 214 includes a first transistor 216 connected to a voltage source at a voltage source node 224 and a second transistor 218 connected to ground. A first gate 220 of first transistor 216 and a second gate 222 of second transistor 218 can be used to selectively drive a voltage difference (otherwise referred to herein as "Vdiff") associated with biasing a light detector. In particular, Vdiff can correspond to a non-zero voltage associated with the voltage source node 224 or may correspond to zero voltage associated with ground. In this manner, voltage difference driver 214 can be used in conjunction with a charge level of capacitor 212 to drive an output voltage (otherwise referred to herein as "Vout") at the output node 226. Transistors 216 and 218 of the voltage difference driver 214 are depicted as field-effect transistors (FETs), but other transistors or switching devices could be used.

In alternative examples, the voltage difference driver 214 might only include one transistor. For example, transistor 218 could be removed from voltage difference driver 214 or replaced with a diode. In these examples, when transistor 216 is closed, the output voltage is driven to a high level, light detector 228 is biased, and capacitor 212 can be charged. Conversely, when transistor 216 is open, light detector 228 is effectively "floating" (i.e., not connected to a conducting path associated with capacitor 212 being connected to ground or a voltage source). In this state, light detector 228 can automatically be debiased when receiving a light signal, and passively generate currents associated with the light signal (e.g., through leakage).

Thus, voltage difference driver 214 can be configured to connect the second terminal to a voltage source during a first portion of a pulse period of the light detector. For example, this may be performed using transistor 216, a switch, or another means of connecting the second terminal to the voltage source. Connecting the second terminal to the voltage source drives the output voltage to a first voltage level above a biasing threshold of the light detector and thereby biases the light detector.

The voltage difference driver can be further configured to disconnect the second terminal from the voltage source to ground during a second portion of the pulse period. For example, this may be performed using transistor 216, a switch, or another means of disconnecting the second terminal from the voltage source. Disconnecting the second terminal from the voltage source causes the output voltage to reach a second voltage below the biasing threshold of the light detector and thereby debiases the light detector. For example, concurrently with disconnecting the second terminal from the voltage source using transistor 216, voltage difference driver 214 can use transistor 218 to connect the second terminal to ground, which drives the output voltage level to a low level corresponding to a charge level of capacitor 212. In another example, the second terminal is not connected to ground, and disconnecting the second terminal from the voltage source causes light detector 228 to automatically debias based on received light and the charge level of capacitor 212. For example, disconnecting the second terminal from the voltage source may correspond to the light detector (e.g., a SiPM) not reaching a breakdown voltage. Accordingly, a relatively low leakage current corresponds to a correspondingly low voltage drop across the light detector, causing the light detector to be debiased.

FIG. 2A also shows a light detector 228. Though the light detector 228 is depicted as a photodiode, other types of light detectors can be used. For example, a light detector can be a photoconductor (photoresistor), photovoltaic device (photocell), phototransistor, a photodiode, metal-oxide-semiconductor (MOS) capacitor, an avalanche photodiode (APD), a single-photon avalanche diode (SPAD), a silicon photomultiplier (SiPM), or another device capable of producing an output indicative of an intensity of light received by the light detector. Though SiPMs are described below, it should be understood that the light detector 228 can include any of the above-listed light detectors or other types of light detectors. Further, within examples a light detector may be referred to as being "biased." This includes being reversed-biased, as shown in FIG. 2A. Still further, light detector 228 is depicted with dotted lines to signify that, depending on context, it may or may not be considered a part of circuit 200. For example, the light detector 228 may be thought of as being contained within circuit 200, or as being separate element coupled to an output of circuit 200.

A light detector, such as a SiPM, can generate current in response to receiving light. For example, a SiPM generates a current in response to receiving a single photon when the SiPM is reversed-biased with a voltage that is well above its breakdown voltage. For example, this biasing voltage could be about 50 V, and correspond to an output voltage at the output node 226 driven by the capacitor 212 and voltage difference driver 214. In a device (e.g., LIDAR device 100) that includes many SiPMs, biasing the SiPMs continuously may consume a substantial amount of power. To use power more efficiently, the SiPMs can be biased only at certain selected times. For example, in the LIDAR device 100, a SiPM may be biased during two separate periods of time relative to when the SiPM's corresponding light emitter (e.g., a laser diode) is fired: a first period of time (e.g., 1 microsecond) before the laser diode is fired, in order to obtain a background measurement; and a second period of time (e.g., 2 microseconds) after the laser diode is fired that serves as a listening period within which the SiPM can detect a return pulse. During other periods of time, the SiPM is debiased. In this manner, power can be conserved during the debiasing period.

In further examples, the first period of time and the second period of time in which the SiPM is biased may be generically referred to as a first timeframe and a second timeframe of a first portion of a pulse period associated with a light emitter, and the other periods of time in which the SiPM is debiased may be referred to a second portion of the pulse period.

Figure 2B:
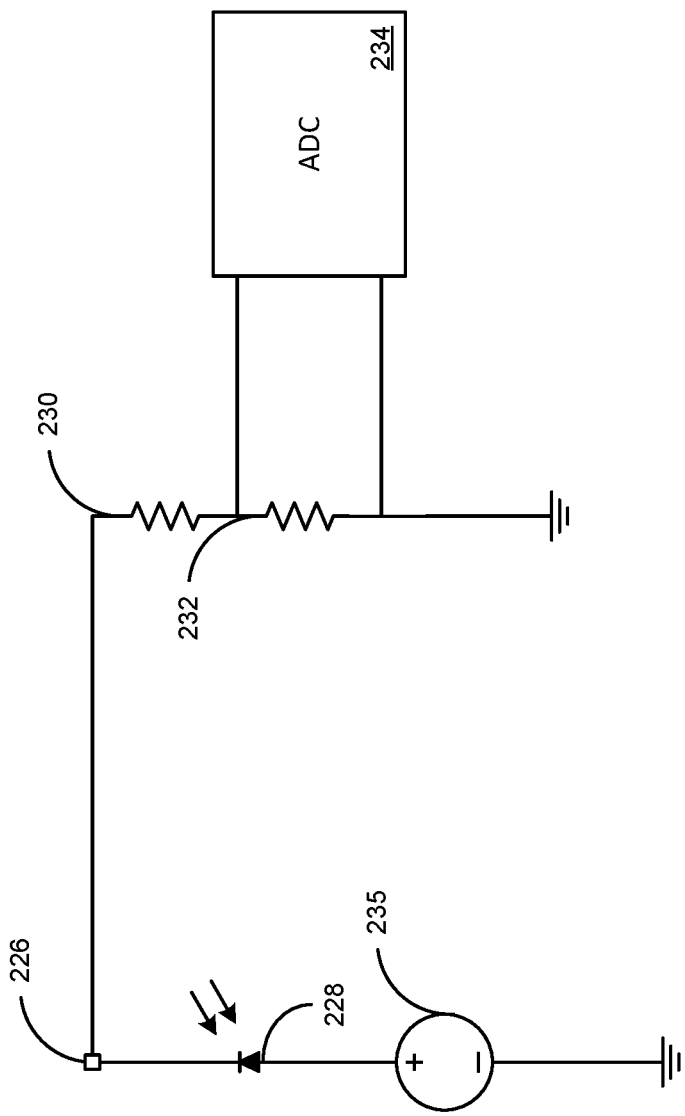
FIG. 2B illustrates a light detector sampling circuit, according to an example embodiment.

To achieve selective biasing and debiasing of a SiPM, the circuit 200 is configured to apply an output voltage (Vout) to the SiPM at output node 226. The output voltage can be adjusted between two levels: a high level (e.g., 50 V) that is sufficient to bias the SiPM and a low level (e.g., 40 V) that is too low to bias the SiPM. Further, Vdiff can be less than half of a biasing voltage of the light detector 228. For example, capacitor 212 can be charged to 40 V using the buck converter, and the voltage difference driver 214 may supply an additional 10 V or 0 V depending on which gates are selected by applying a control voltage to either gate 220 or 222. In this way, control voltages applied to the gates of the FETs shown in FIG. 2A can be used to control whether Vout is at the high level, thereby biasing the SiPM, or at the low level, thereby debiasing the SiPM. Specifically, when the first transistor 216 is on and the second transistor 218 is off, the second terminal of capacitor 212 is connected to the voltage source and Vout is at the high level. Conversely, when the first transistor 216 is off and the second transistor 218 is on, the second terminal of capacitor 212 is connected to ground and Vout is at the low level. FIG. 2B illustrates a light detector sampling circuit, according to an example embodiment. In particular, FIG. 2B shows an extension of circuit 200 coupled to the output node 226. A cathode of light detector 228 is connected to output node 226 and an anode of light detector 228 is connected to a voltage source 235, which in turn is connected to ground. It should be understood that voltage source 235 is provided for illustrative purposes, and might not be present in the light detector sampling circuit. When light detector 228 is biased based on Vout being above a biasing threshold, light detector 228 drives a current through output node 226. Conceptually, voltage source 235 can be understood as being as a negative voltage when light detector 228 is biased (e.g., −50V) and at or near 0V when light detector 228 is debiased. For example, when light detector is debiased, voltage source 235 can be understood to be at a relatively low voltage (e.g., less than 1V) attributable to a leakage current from light detector 228. The current can be proportional to an intensity of light received by light detector 228. The light detector sampling circuit further includes a voltage divider that includes a first resistor 230 and a second resistor 232. Detecting the level of light received by light detector 228 involves sampling a voltage drop at second resistor 232 using an ADC 234. In particular, when light detector 228 is biased and receives light, capacitor 212 the light detector 228 drives a current and capacitor 212 discharges. For example, this may occur during a listening period of the circuit 200. ADC 234 samples the voltage level at the second resistor 232 before and after the capacitor 212 discharges (e.g., at the beginning of the listening period and at the end of the listening period). Thus, the current driven by the light detector 228 can be inferred as being equal or proportional to a capacitance (C) of capacitor 212 multiplied by a difference in voltage (V2−V1) between samples and divided by the time difference (t2−t1) between samples (I=C*(V2−V1)/(t2−t1). An ADC 234 is used for measuring the voltage drop across the second resistor 232. In turn, the controller 102 may interpret values sampled by the ADC to determine an intensity of light received by light detector 228. In implementations in which a SiPM is used as light detector 228, a number of photons received by the SiPM can be determined. This may also be possible with other types of light detectors as well.

Figure 2C:
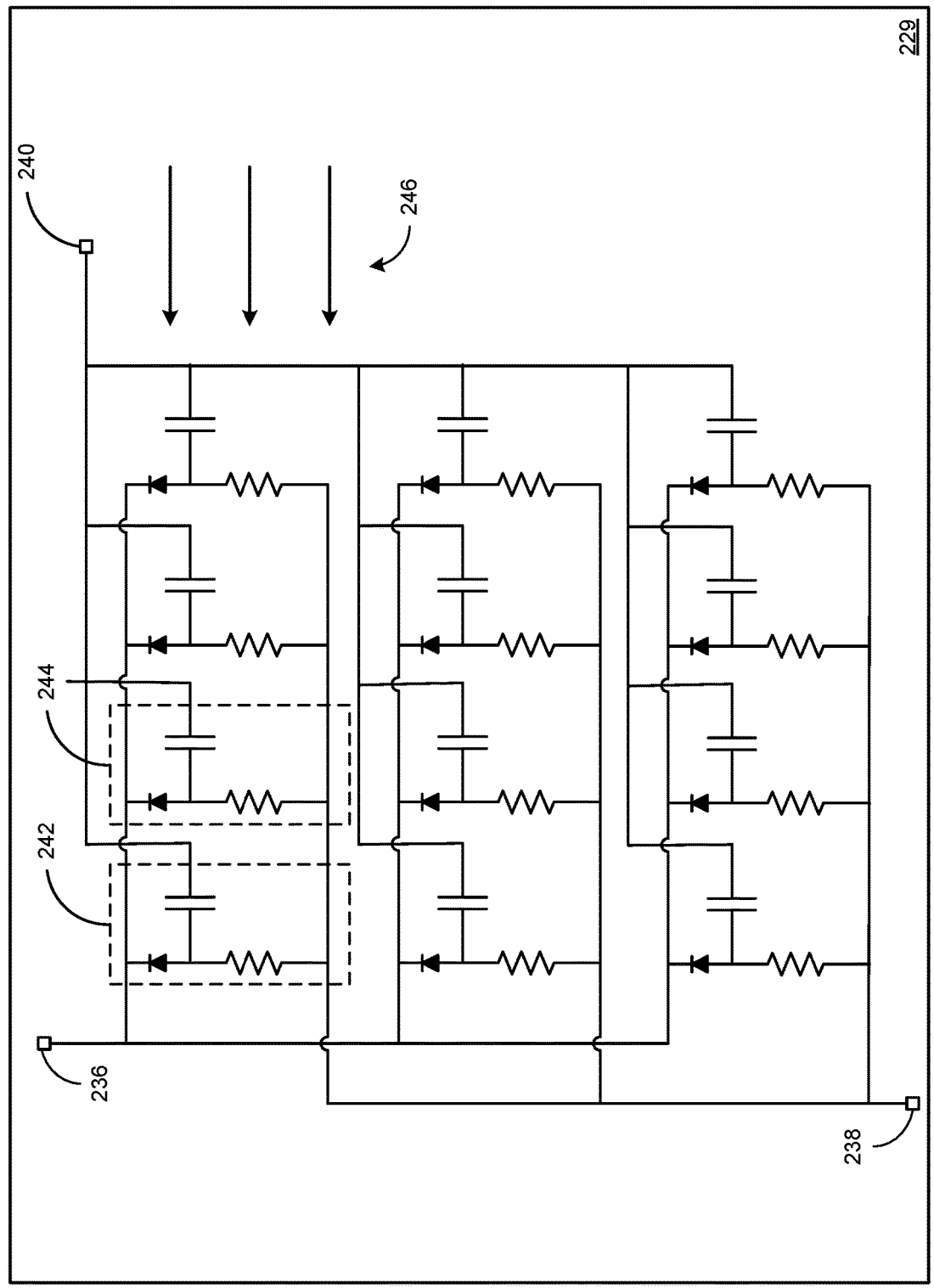
FIG. 2C illustrates a silicon photomultiplier (SiPM), according to an example embodiment.

FIG. 2C illustrates a silicon photomultiplier (SiPM), according to an example embodiment. In particular, FIG. 2C shows a simplified representation of a SiPM 229. For purposes of example, SiPM 229 may operate as described above with respect to light detector 228. SiPM 229 includes a cathode 236, an anode 238, and a fast output 240. For purposes of continuity, it should be understood that the cathode 236 could connect to the output node 226, and the fast output 240 could effectively continue the output node 226 and drive a current towards other elements of corresponding circuitry, such as the voltage divider shown in FIG. 2B. The SiPM includes an array of microcells including a first microcell 242 and a second microcell 244. Each microcell is configured to detect light, such as incident light 246. When any of the microcells receives a photon, a current is driven via the fast output. This current may be proportional to the amount of incident light 246 received by the plurality of microcells, and the resulting current can be used to determine how many photons are received by SiPM 229.

Biasing and debiasing SiPM 229 can be performed in accordance with a regular cycle. For example, a known pulse period may be associated with a light emitter (e.g., a laser diode) emitting light, and biasing and debiasing SiPM 229 may be performed in accordance with the known pulse period. In this manner, the corresponding circuit may operate in cohesion with other circuitry configured for emitting light from one or more laser diodes.

Using the SiPM 229 to detect individual photons can occur during a listening period that has a defined duration (e.g., 2 microseconds) after the light emitter (e.g., a laser diode) is fired. A light pulse is detected when a sampled photon count exceeds a threshold. For example, the threshold count (e.g., 100 photons) may be determined based on a current level driven by SiPM 229 while operationally biased or by a corresponding voltage level resulting from the current.

Within examples, determining a threshold count can be determined dynamically for each listening period. For example, each light detector can measure a background noise level during a background measurement period of defined duration (e.g., 1 microsecond) before the laser diode is fired. The threshold used in the listening period of each particular light detector can be based on the background noise level that is measured during the background measurement period of that particular light detector. This threshold may correspond to a voltage level detected during the background measurement period. For example, four photons might be detected during a first timeframe based on a voltage level detected during the first timeframe and the threshold count for detecting a light pulse can be adjusted to 104 photons during the second timeframe. In this manner, reflected light pulses are detected based on a light level in the environment determined during the first timeframe and detection operations are carried out. In other implementations, a number of photons might not be explicitly determined, but detection of reflected light pulses is rather based on an output signal (e.g, an output voltage and/or current level sampled over time) of SiPM 229. For example, a matched filter that correlates an expected signal to an output signal of SiPM 229 (or, for example, light detector 228) could be applied to determine whether a reflected portion of a light pulse has been received by SiPM 229.

Figure 3:
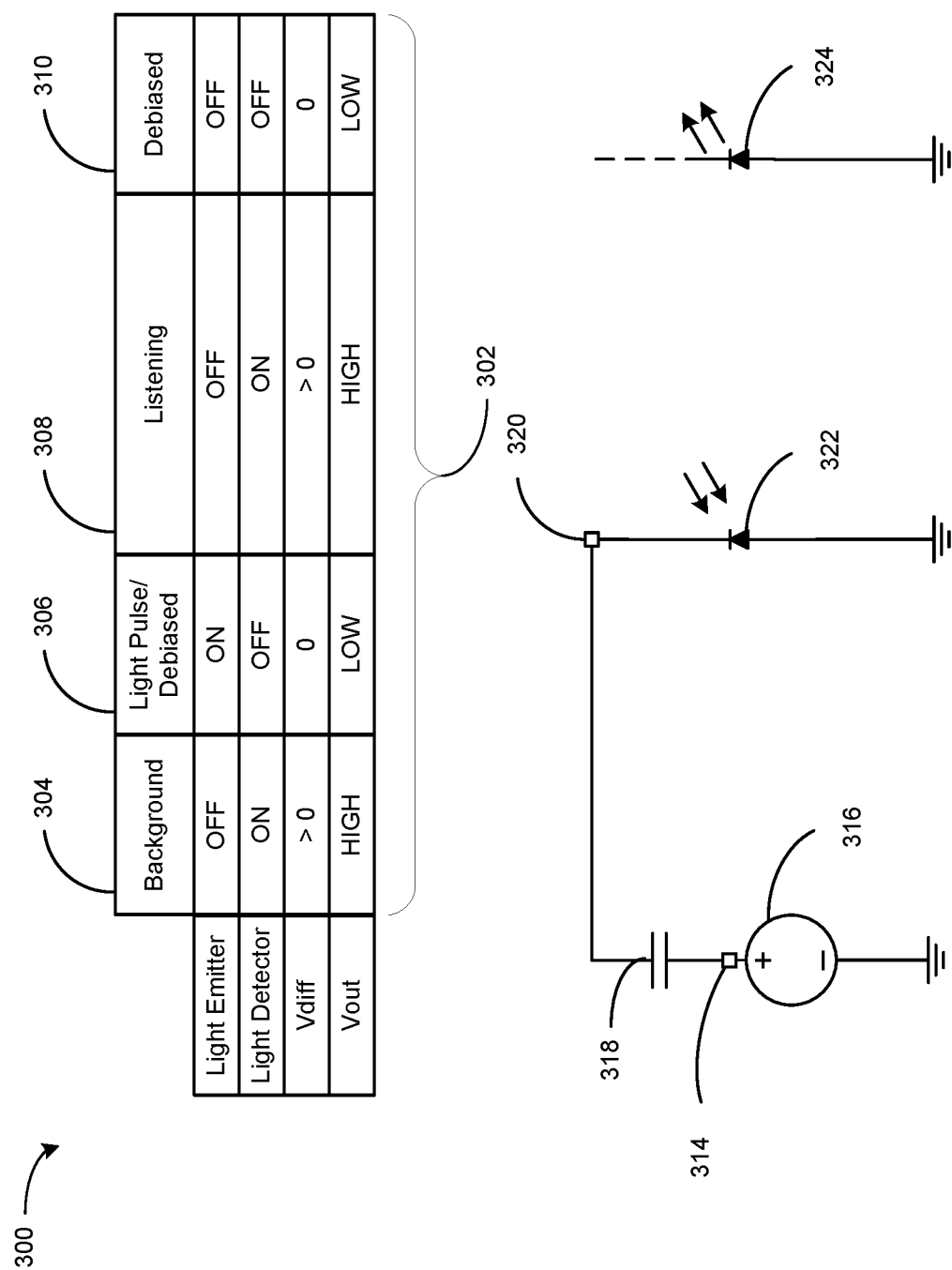
FIG. 3 illustrates a timing diagram of a system, according to an example embodiment.

FIG. 3 illustrates a timing diagram of a system, according to an example embodiment. In particular, a timing diagram 300 of a simplified system for biasing light detectors is shown. A circuit is provided that includes a Vdiff node 314, a voltage source 316 that supplies the voltage at Vdiff node 314, a capacitor 318, an output node 320, and a light detector 322. The voltage source 316 is a simplified representation of a voltage difference driver configured to selectively drive Vdiff node 314 to a first voltage level and a second voltage level. FIG. 3 also shows a light emitter 324 that can be part of the same system. For example, the light emitter 324 can be coupled to separate circuitry within the same system as the light detector biasing circuit.

Timing diagram 300 shows a pulse period 302 of the light emitter 324 and light detector 322. Pulse period 302 includes a plurality of timeframes associated with states of light emitter 324, light detector 322, Vdiff node 314 and output node 320. The pulse period includes a first timeframe 304, a second timeframe 306, a third timeframe 308, and a fourth timeframe 310. These timeframes can be grouped into a first portion including first timeframe 304 and third timeframe 308 and a second portion including second timeframe 306 and fourth timeframe 310. The first portion of pulse period 302 corresponds to light detector 322 being operationally biased and the second portion of pulse period 302 corresponds to light detector 322 not being operationally biased.

First timeframe 304 corresponds to detecting background noise in an environment of the LIDAR device. During first timeframe 304, light emitter 324 is off (i.e., not emitting light), light detector 322 is on (i.e., it is operationally biased allowing for detection of incident light), Vdiff is greater than zero (i.e., voltage source 316 drives a voltage level at Vdiff node 314 to a non-zero value), and Vout is at a high level corresponding to Vdiff being greater than zero and capacitor 318 being charged to a charge level. In this example, Vdiff is a predetermined voltage difference between a charge level of capacitor 318 (e.g., 40 V) and the high voltage level at Vout (e.g., 50 V). The high voltage level is high enough to bias light detector 322, while a low voltage level (e.g., 40 V) is too low to bias light detector 322. Charging capacitor 318 to hold the output voltage at a non-zero voltage level that is close to (e.g., less than 10 V from) a biasing voltage of light detector 322 allows for less charge being required from voltage source 316 in order to result in an output voltage that operationally biases light detector 322.

Though pulse period 302 is depicted with respect to light detector 322 and light emitter 324, a same or similar pulse period may be associated with each light emitter and corresponding light detector in a LIDAR device. Correspondingly, as described above with respect to FIG. 2C, background detection performed during first timeframe 304 can include determining an output current and/or voltage associated with each light detector, and can also involve determining a number of photons detected by each light detector. In some examples, different background noise levels (e.g., light levels present in an environment at different directions) can be detected by different light detectors at different times. Accordingly, first timeframe 304 can be used to set thresholds for detecting reflected light pulses from each light emitter in a system, such as a LIDAR device.

As shown in FIG. 3, a duration of first timeframe 304 used for determining a background light level can be approximately the same (e.g., within 5% of) a duration of second timeframe 306 used for emitting a pulse of light. For example, the duration of first timeframe 304 and second timeframe 306 may both be about 1 µs. This can allow for a more accurate determination of how much light (e.g., how many photons) are attributable to background noise during third timeframe 308, as described further below.

Within examples, determining a background light level can correspond to determining a rate of receiving photons based on ambient light in the environment. This may involve setting a threshold (e.g., corresponding to receiving an individual photon) and counting the number of times a received light signal exceeds the threshold within a period of time. For example, if 10 counts of exceeding the threshold occur in a first background period of 1 microsecond, 20 counts of exceeding the threshold can be expected during a background period of 2 microseconds. In other examples, a first period may have a first threshold for detecting photons, and a second period may have a second threshold. The second threshold may be a function of the first threshold, though other implementations are possible. This can be repeated over several periods for detecting background light levels.

As described further below, after determining an estimated rate of receiving background photons to determine the background light level, the rate of background photon reception can be used to set a threshold while listening for a reflected light pulse. Because, in some examples, the listening period (third timeframe 308) can be relatively short compared to a period for determining the background light level (e.g., nanoseconds for the listening period versus one or more microseconds for determining the background light level) statistical assumptions about receiving background photons can serve as a basis for adjusting detection thresholds for receiving reflected light pulses. Setting these detection thresholds may not be directly proportional to detected background levels. For example, the number of expected background photons during third timeframe 306 can be rounded up or rounded down based on statistical characteristics of the background level.

Within examples, first timeframe 304 and second timeframe 306 may be partially or fully concurrent. This may similarly allow for accurate noise estimations while potentially reducing pulse period 302 and correspondingly allow for increased frequency of light pulses. However, because biasing light detector 322 may result in capacitor 318 discharging to some degree, time might be taken during second timeframe 306 to recharge the capacitor (e.g., using the boost converter shown in FIG. 2A). In still further examples, the first timeframe might not be used to bias light detector 322. For example, a background might not be determined in order to further conserve power. In these scenarios an average background light level may be used for purposes of estimating a received light level. In other examples, no background light level may be considered at all. Such examples further simplify determination of detections of reflected light pulses, but may be less robust than those described with respect to timing diagram 300 shown in FIG. 3.

Second timeframe 306 corresponds to emitting a light pulse using light emitter 324. During this timeframe, it is understood that any light detected by light detector 322 is not attributable to light emitter 324. Accordingly, light detector 322 is debiased. During second timeframe 306, light emitter 324 is on (i.e., emitting light), light detector 322 is off (i.e., not operationally biased), Vdiff is lowered (i.e., voltage source 316 drives a voltage level at Vdiff node 314 to a lower value than during first timeframe 304, such as 0 V), and Vout is at a low level corresponding to Vdiff being lower (e.g., 0 V) and capacitor 318 being charged to a charge level. Debiasing light detector 322 in this manner allows for less energy waste because biasing light emitter 322 results in light emitter 322 driving current being based on background noise. Because a LIDAR device may have several light detectors (e.g., hundreds of light detectors), this power waste can be significant, and possibly result in unnecessary heat generated in the LIDAR device.

Third timeframe 308 corresponds to a listening period for light detector 322 to receive a reflected portion of the light pulse emitted during second timeframe 306. As shown in FIG. 3, third timeframe 308 is about twice as long as second timeframe 306. This allows time for a light pulse to reach an object in the environment to be reflected back towards light detector 322. For example, where the light pulse is emitted for about 1 µs, listening for reflected pulses for about 2 µs allows for reflections to be detected about 150 m away from the LIDAR device. Other durations of each timeframe are possible.

While listening for reflected light pulses during third timeframe 308, light emitter 324 is off (i.e., not emitting light), light detector 322 is on (i.e., it is operationally biased allowing for detection of incident light), Vdiff is greater than zero (i.e., voltage source 316 drives a voltage level at Vdiff node 314 to a non-zero value), and Vout is at a high level corresponding to Vdiff being greater than zero and capacitor 318 being charged to a charge level. An output voltage and/or current at output node 320 can be measured to determine a light level received by light detector 322 (e.g., a number of photons received during third timeframe 308). Comparing this value to a threshold value associated with receiving a reflected light pulse (e.g., a threshold number of photons received by light detector 322) allows for the system to detect reflections. For example, based at least on a received power level of a reflected light pulse, a threshold can be determined that accounts for attenuated reflections from less-reflective objects in the environment.

As noted above, a noise level determined during first timeframe 304 can allow a light level to be determined that is not associated with light emitted from light emitter 324. The background light level can be accounted for in detecting light pulses. Also relevant in this determination is a length of listening for reflected pulses during third timeframe 308. For example, if third timeframe 308 is twice the duration of second timeframe 306 and/or first timeframe 304, it is expected that twice as many photons received during third timeframe 308 are attributable to background noise. Accordingly, a multiplier may be determined based on the duration of third timeframe 308 relative to second timeframe 306 and/or first timeframe 304. In the present example, the multiplier is two (2 µs/1 µs). This multiplier and a light level determined during first timeframe 304 can be used to adjust thresholds for detecting light pulses. Thus, if four photons are received during first timeframe 304, and the default threshold light level is 100 photons, the threshold light level can be adjusted to 108 photons. This may be performed for each light emitter/light detector during each respective pulse period for the LIDAR device, and can allow for accurate and dynamic sensing of light pulses. As noted above with respect to determining the background light level, in some examples the expected background light level received during the third timeframe 308 might not be directly proportional to a light level received during first timeframe 304. For example, a statistical characteristic of receiving background photons can be used to set the threshold light level for detecting reflected light pulses.

Fourth timeframe 310 corresponds to a latent period between pulse period 302 and a recurring pulse period.

During fourth timeframe 310, light emitter 324 is off (i.e., not emitting light), light detector 322 is off (i.e., not operationally biased), Vdiff is lowered (i.e., voltage source 316 drives a voltage level at Vdiff node 314 to a lower value than during first timeframe 304, such as 0 V), and Vout is at a low level corresponding to Vdiff being lowered (e.g., 0 V). During this timeframe, capacitor 318 may also be charged to a charge level. By debiasing light detector 322 during latent periods between pulse periods, the system can conserve energy because light detector 322 is not driving currents associated with background noise during these times. Across on entire LIDAR system this may conserve large quantities of energy and reduce heat levels in the LIDAR device. Depending on how frequently pulses are emitted, fourth timeframe 310 might not be part of pulse period 302, and pulse period 302 might only include first timeframe 304, second timeframe 306, and third timeframe 308. Within further examples, depending on an operational state of the LIDAR device, fourth timeframe 310 can be reduced or increased. For example, during a energy-saving state, the LIDAR device may increase fourth timeframe 310 to effectively reduce the frequency of emitting light pulses.

III. Example Methods

FIG. 4 is a block diagram of a method, according to an example embodiment. In particular, FIG. 4 depicts a method 400 for use in selectively emitting light from a plurality of light emitters. Method 400 may be implemented in accordance with LIDAR device 100, circuit 200, timing diagram 300 or the description thereof. For example, aspects of the functions of method 400 may be performed by controller 102, circuit 200, or by logical circuitry configured to implement the functions described above with respect to FIGS. 1, 2A, 2B, 2C, and 3.

At block 402, method 400 includes, charging, to a charge level (e.g., 40 V), a biasing capacitor having a first terminal and a second terminal. The first terminal of the biasing capacitor is configured to apply an output voltage to a light detector, and wherein the charging is via the first terminal. For example, this may be performed prior to determining a background noise level of an environment or a listening period for detecting reflected light pulses from a light emitter.

At block 404, method 400 includes connecting the second terminal of the biasing capacitor to a voltage source during a first portion of a pulse period associated with the light detector. For example, this may involve switching a first FET on and a second FET off in a voltage difference driver to connect the second terminal to a voltage source associated with the voltage difference driver. As another example, this may be performed in accordance with first timeframe 304 and/or third timeframe 308 within pulse period 302 depicted in FIG. 3. Connecting the second terminal to the voltage source drives the output voltage to a first voltage level (e.g., 50 V) above a biasing threshold (e.g., 45 V) of the light detector and thereby biasing the light detector. Biasing the light detector may involve reverse-biasing the light detector.

At block 406, method 400 includes connecting the second terminal of the biasing capacitor to ground during a second portion of the pulse period. For example, this may involve switching a first FET off and a second FET on in a voltage difference driver to connect the second terminal to a ground associated with the voltage difference driver. As another example, this may be performed in accordance with second timeframe 306 and/or fourth timeframe 310 within pulse period 302 depicted in FIG. 3. Connecting the second terminal to ground drives the output voltage to a second voltage level (40 V) below the biasing threshold (e.g., 45 V) of the light detector and thereby debiasing the light detector. The second voltage is a non-zero voltage that corresponds to the charge level of the biasing capacitor.

Within examples, method 400 further includes emitting, by a light emitter, a light pulse during the second portion of the pulse period. The first portion of the pulse period includes a first timeframe preceding the light pulse and a second timeframe following the light pulse. For example, emitting the light pulse may be performed in accordance with second timeframe 306 depicted in FIG. 3. In this context, the first timeframe preceding the light pulse corresponds to first timeframe 304 and the second timeframe following the light pulse corresponds to third timeframe 308. Within these examples, method 400 further includes receiving a reflected portion of the light pulse by the light detector during the second timeframe of the first portion of the pulse period. For example, this may include receiving incident light at the light detector, such as incident light 246 shown in FIG. 2C. Within these examples, method 400 further includes detecting the reflected portion of the light pulse during the second portion of the pulse period based on biasing the light detector and receiving the reflected portion of the light pulse. For example, the light detector may drive a current in response to being operationally biased. This can correspondingly result in a voltage level sampled by an ADC, which is associated with a light level received by the light detector. For example, different voltage levels can be associated with different numbers of photons received by the light detector over time.

Within examples in which the first portion of the pulse period includes a first timeframe and a second timeframe, the first timeframe can be a first duration (e.g., approximately 1 μs), and the second timeframe can be a second duration (e.g., a duration associated with the light pulse, returning from a range of interest, such as 2 μs). In this manner, the first timeframe can serve to determine a background light level expected while receiving the light pulse by biasing the light detector directly preceding the light pulse. Further the second timeframe can be associated with listening for a reflection of the light pulse by biasing the light detector directly following the light pulse.

Within examples, method 400 further includes detecting a first signal (e.g. a background voltage) corresponding to an output of the light detector during the first timeframe. For example, the first signal may correspond to the output voltage at output node 320 during first timeframe 304 in FIG. 3, a voltage drop across second resistor 232 in FIG. 2B, or another voltage driven by an output current of the light detector. The first signal is indicative of a background light level preceding the light pulse. For example, this may indicate a number of photons received by the light detector during the first timeframe. Within these examples, method 400 further includes detecting a second signal (e.g., a reflection voltage) corresponding to a voltage output of the light detector during the second timeframe. For example, the second signal may correspond to the output voltage at output node 320 during third timeframe 308 in FIG. 3, a voltage drop across second resistor 232 in FIG. 2B, or another voltage driven by an output current of the light detector. The second signal is indicative of the reflected portion of the light pulse after the light pulse. For example, this may indicate a number of photons received from the reflected light pulse in addition to background noise received during this timeframe. Accordingly, within these examples, method 400 further includes determining the background light level based on the first signal, setting a threshold signal (e.g., a threshold voltage level) for detecting a reflected light pulse based on the background light level, and, based on the second signal exceeding the threshold signal level, determining that a reflected light pulse has been detected by the light detector. In related examples, a threshold number of photons may be set or a threshold light level, and a voltage and/or current output from the light detector can be used to determine the light level or number of photons received by the light detector prior to performing a comparison of the detected light level to the threshold value. In still other implementations, a number of photons might not be explicitly determined, but detection of reflected light pulses can rather be based on an output signal (e.g, an output voltage and/or current level sampled over time) of the light detector. For example, a matched filter (e.g., determined using the background light level and an expected reflected pulse, or based only on an expected reflected pulse) that correlates an expected signal to an output signal of the light detector could be applied to determine whether a reflected portion of a light pulse has been received by the light detector. Other ways of detecting reflected light pulses are possible. In this manner, a LIDAR device can dynamically determine appropriate values for detecting a reflected light pulse. In bright conditions, for example, a higher threshold might be set, while in low-light conditions, a lower threshold can be used for detecting reflected pulses of light.

Within examples, method 400 includes determining an aspect of an environment (e.g., an environment of a LIDAR device) associated with a relatively high reflection strength (e.g., greater than a threshold reflection strength, such as 95% of the strength of an emitted light pulse). Determining the aspect of the environment associated with the relatively high reflection strength can include scanning the environment using the light emitters and light detectors, and identifying a portion of the environment that has a relatively strong reflection (e.g., a retroreflector may return a relatively high reflection of an emitted light pulse, such as 95% or more of an emitted light pulse). In other examples, highly-reflective aspects of the environment may be predetermined (e.g., mapped), and the aspect of the environment may be determined to correspond to the predetermined highly reflective aspects (e.g., matching a portion of the environment to a mapped portion of the environment). Responsive to determining the aspect of the environment associated with the relatively high reflection strength, the LIDAR device may debias the SiPM in anticipation of receiving the relatively strong reflection. In this manner, the light detector may operate with a lower gain responsive to a determination that an aspect of the environment is highly-reflective. For example, when debiased, a SiPM may operate similarly to an avalanche photodiode (APD) and produce a lower gain than when the SiPM is biased. Debiasing the SiPM in this manner can prevent oversaturating an Analog-to-Digital converter (ADC) used for sampling outputs of the biasing circuit. Accordingly, a dynamic range of the LIDAR device can be adjusted based on relative levels of reflection from different portions of the environment.

Systems and methods are described herein that generally assist in reducing power consumption for a LIDAR device. Accordingly, within examples, method 400 may further determine an operational state of the LIDAR device and alter aspects of the pulse period based on the operational state. For example, the LIDAR device may enter a power-saver state when a power source is below a threshold level (e.g., a battery falling below 15% charge). Responsive to entering the power-saver state, the LIDAR device may add a latent timeframe (e.g., fourth timeframe 310 shown in FIG. 3) after the second timeframe of the first period of the pulse period that increases the time in each pulse period during which the light detector is debiased. In other examples the LIDAR device may enter a close-quarters state during which objects in the environment are relatively close (e.g., upon detecting that the LIDAR device has entered a tunnel or a traffic jam), and responsively reduce the second timeframe of the first portion of the pulse period (e.g., third timeframe 308 in FIG. 3) to reduce the time that the light detectors are biased during the pulse period. Other states of the LIDAR device and corresponding changes to aspects of the pulse period and corresponding circuitry are possible.

Though example embodiments described herein generally relate to a single light detector and a corresponding light emitter, similar operations may be carried out with respect to each light detector and light emitter in a LIDAR device. Further, some light detectors may be treated differently. For example, different detection thresholds might be used for different light detectors. Further, while a pulse period may be synchronized between a plurality of light detectors and light emitters, in other examples each pulse period might be staggered or altered based on differing characteristics of each light detector and light emitter.

Within examples, method 400 may be performed multiple times in succession, with different aspects of the pulse periods changing based on contexts of the system. In this manner the systems and methods described herein may adapt to changing conditions in the environment or different instructions received, for example, from controller 102.

Figure 5:
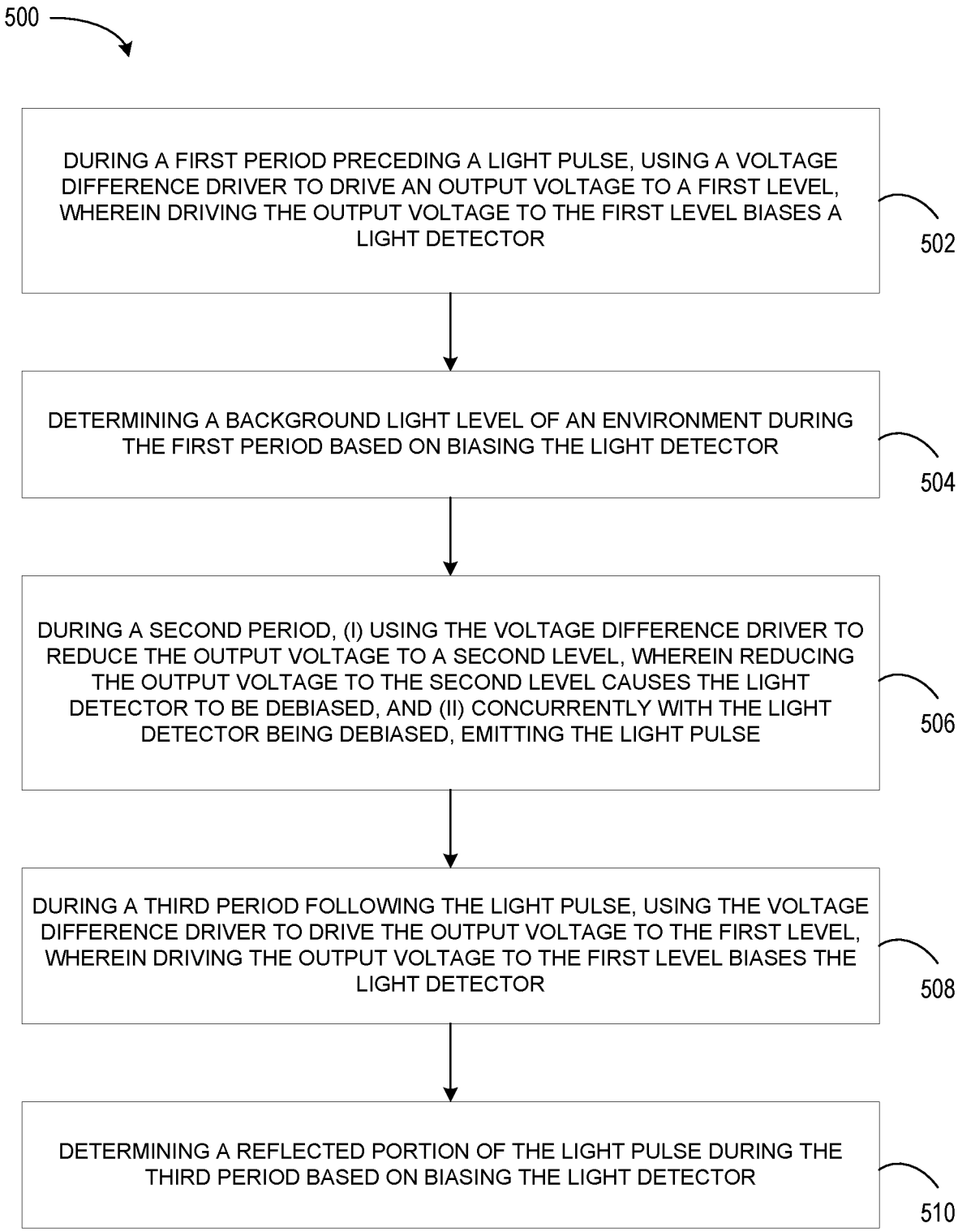
FIG. 5 is a block diagram of a method, according to an example embodiment.

FIG. 5 is a block diagram of a method, according to an example embodiment. In particular, FIG. 5 depicts a method 500 for use in selectively emitting light from a plurality of light emitters. Method 500 may be implemented in accordance with LIDAR device 100, circuit 200, timing diagram 300 or the description thereof. For example, aspects of the functions of method 500 may be performed by controller 102, circuit 200, or by logical circuitry configured to implement the functions described above with respect to FIGS. 1, 2A, 2B, 2C, and 3. Further, aspects of method 500 can be combined with, replaced by, or supplement aspects of method 400.

At block 502, method 500 includes, during a first period preceding a light pulse, using a voltage difference driver (e.g., voltage difference driver 214) to drive an output voltage to a first level. Driving the output voltage to the first level biases a light detector. The first period can correspond to first timeframe 304. Though the voltage difference driver of block 502 can be the same or similar to voltage difference driver 214 described above in relation to FIG. 2A, it should be understood that different configurations of the voltage difference driver are possible. For example, the voltage difference driver can drive a range of output voltages at a node associated with the light detector. Further, the voltage difference driver might not be connected to a biasing capacitor.

At block 504, method 500 includes determining a background light level of an environment during the first period based on biasing the light detector.

At block 506, method 500 includes, during a second period, (i) using the voltage difference driver to reduce the output voltage to a second level, wherein reducing the output voltage to the second level causes the light detector to be debiased and (ii) concurrently with the light detector being debiased, emitting the light pulse. For example, the light pulse can be emitted by a light emitter, such as a laser diode. The second period can correspond to second timeframe 306.

At block 508, method 500 includes, during a third period following the light pulse, using the voltage difference driver to drive the output voltage to the first level, wherein driving the output voltage to the first level biases the light detector. The third period can correspond to third timeframe 308.

At block 510, method 500 includes determining a reflected portion of the light pulse during the third period based on biasing the light detector.

Within examples, determining the reflected portion of the light pulse during the third period includes determining the reflected portion of the light pulse based on a difference between the third period and the first period. For example, in a LIDAR device, a light detector can be a SiPM and the SiPM may be biased during two separate periods of time relative to when the SiPM's corresponding light emitter (e.g., a laser diode) is fired: a first period of time (e.g., 1 microsecond) before a second period of time (e.g., 5 nanoseconds) during which the laser diode is fired in order to obtain a background measurement; and a second period of time (e.g., 2 microseconds) after the laser diode is fired that serves as a listening period within which the SiPM can detect a return pulse. During other periods of time, the SiPM can be debiased. A difference between a duration of the first period and the third period can be taken into account when detecting the reflected portion of the light pulse, similar to the differences between first timeframe 304 and third timeframe 308 as described above.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   a light emitter configured to emit a light pulse during a pulse period, wherein the pulse period includes a timeframe preceding the light pulse and a timeframe following the light pulse;
   a light detector; and
   a circuit connected to the light detector, wherein the circuit is configured to:
      detect a first signal corresponding to an output of the light detector during the timeframe preceding the light pulse;
      detect a second signal corresponding to an output of the light detector during the timeframe following the light pulse;
      bias the light detector during a first portion of the pulse period; and
      debias the light detector during a second portion of the pulse period, wherein the light emitter is configured to emit the light pulse during the second portion of the pulse period, and wherein the first portion of the pulse period includes the timeframe preceding the light pulse and the timeframe following the light pulse.

2. The device of claim 1, wherein the circuit comprises an Analog-to-Digital Converter (ADC).

3. The device of claim 1, further comprising a controller coupled to the circuit, wherein the controller is configured to:
   determine a background light level based on the first signal;
   set a threshold signal level based on the background light level; and
   determine whether the second signal exceeds the threshold signal level.

4. The device of claim 3, wherein the controller is further configured to:
   based on a determination that the second signal exceeds the threshold signal level, determine that a reflected light pulse has been detected by the light detector.

5. The device of claim 4, wherein the light detector is a silicon photomultiplier (SiPM), wherein the first signal is indicative of a first photon count and the second signal is indicative of a second photon count.

6. The device of claim 5, wherein the threshold signal level is indicative of a threshold photon count, and wherein the threshold photon count is greater than the first photon count.

7. The device of claim 4, wherein the light pulse is a first light pulse, the pulse period is a first pulse period, the background light level is a first background light level, the threshold signal level is a first threshold signal level, and the reflected light pulse is a first reflected light pulse,
   wherein the light emitter is further configured to emit a second light pulse during a second pulse period, wherein the second pulse period includes a timeframe preceding the second light pulse and a timeframe following the second light pulse, and
   wherein the controller is further configured to:
      determine a second background light level based on an output of the light detector during the timeframe preceding the second light pulse; and set, based on the second background light level, a second threshold signal level for detecting a second reflected light pulse during the timeframe following the second light pulse.

8. The device of claim 1, wherein the circuit is further configured to:
apply a first voltage to the light detector to bias the light detector; and
apply a second voltage to the light detector to debias the light detector.

9. The device of claim 8, wherein the circuit comprises a capacitor having a first terminal and a second terminal, wherein the first terminal of the capacitor applies the first voltage to the light detector when the second terminal of the capacitor is connected to a voltage source, and wherein the first terminal of the capacitor applies the second voltage to the light detector when the second terminal of the capacitor is connected to a ground.

10. The device of claim 9, wherein the circuit further comprises:
a first transistor connected to the voltage source and to the second terminal of the capacitor; and
a second transistor connected to the ground and to the second terminal of the capacitor.

11. The device of claim 10,
wherein the second terminal of the capacitor is connected to the voltage source such that the first terminal of the capacitor applies the first voltage to the light detector to bias the light detector when the first transistor is on and the second transistor is off, and
wherein the second terminal of the capacitor is connected to the ground such that the first terminal of the capacitor applies the second voltage to the light detector to debias the light detector when the first transistor is off and the second transistor is on.

12. A method comprising:
emitting, by a light emitter, a light pulse during a pulse period, wherein the pulse period includes a timeframe preceding the light pulse and a timeframe following the light pulse;
detecting, by a circuit connected to a light detector, a first signal corresponding to an output of the light detector during the timeframe preceding the light pulse;
detecting, by the circuit, a second signal corresponding to an output of the light detector during the timeframe following the light pulse;
biasing, by the circuit, the light detector during a first portion of the pulse period; and
debiasing, by the circuit, the light detector during a second portion of the pulse period, wherein the light pulse is emitted during the second portion of the pulse period, and wherein the first portion of the pulse period includes the timeframe preceding the light pulse and the timeframe following the light pulse.

13. The method of claim 12, further comprising:
determining a background light level based on the first signal;
setting a threshold signal level based on the background light level; and
determining whether the second signal exceeds the threshold signal level.

14. The method of claim 13, further comprising
based on a determination that the second signal exceeds the threshold signal level, determining that a reflected light pulse has been detected by the light detector.

15. The method of claim 14, wherein the light detector is a silicon photomultiplier (SiPM), wherein the first signal is indicative of a first photon count and the second signal is indicative of a second photon count.

16. The method of claim 15, wherein the threshold signal level is indicative of a threshold photon count, and wherein the threshold photon count is greater than the first photon count.

17. The method of claim 14, wherein the light pulse is a first light pulse, the pulse period is a first pulse period, the background light level is a first background light level, the threshold signal level is a first threshold signal level, and the reflected light pulse is a first reflected light pulse, further comprising:
emitting, by the light emitter a second light pulse during a second pulse period, wherein the second pulse period includes a timeframe preceding the second light pulse and a timeframe following the second light pulse;
determining a second background light level based on an output of the light detector during the timeframe preceding the second light pulse; and
setting, based on the second background light level, a second threshold signal level for detecting a second reflected light pulse during the timeframe following the second light pulse.

18. The method of claim 12, wherein biasing the light detector comprises applying a first voltage to the light detector, and wherein debiasing the light detector comprises applying a second voltage to the light detector.

19. The method of claim 18, wherein the circuit comprises a capacitor having a first terminal and a second terminal, wherein applying the first voltage to the light detector comprises applying the first voltage from the first terminal of the capacitor, and wherein applying the second voltage to the light detector comprises applying the second voltage from the first terminal of the capacitor.

20. The method of claim 19, wherein applying the first voltage to the light detector further comprises connecting the second terminal of the capacitor to a voltage source, and wherein applying the second voltage to the light detector further comprises connecting the second terminal of the capacitor to a ground.

* * * * *